US011518296B2

(12) United States Patent
Fowler et al.

(10) Patent No.: US 11,518,296 B2
(45) Date of Patent: Dec. 6, 2022

(54) RETENTION DEVICE FOR VEHICLE SEAT

(71) Applicant: Ford Global Technologies, LLC, Dearborn, MI (US)

(72) Inventors: James Hugh Fowler, Novi, MI (US); Marcos Silva Kondrad, Macomb Township, MI (US); Kevin Wayne Preuss, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 747 days.

(21) Appl. No.: 16/269,091

(22) Filed: Feb. 6, 2019

(65) Prior Publication Data

US 2020/0247304 A1 Aug. 6, 2020

(51) Int. Cl.
*B60P 7/08* (2006.01)
*B60R 11/00* (2006.01)
*B60R 22/00* (2006.01)

(52) U.S. Cl.
CPC ........... *B60P 7/0807* (2013.01); *B60P 7/0823* (2013.01); *B60P 7/0876* (2013.01); *B60R 2011/0012* (2013.01); *B60R 2011/0059* (2013.01); *B60R 2011/0071* (2013.01); *B60R 2022/005* (2013.01)

(58) Field of Classification Search
CPC ..... B60P 7/0807; B60P 7/0823; B60P 7/0876; B60R 2011/0012; B60R 2011/0059; B60R 2011/0071; B60R 2022/005; B60R 2011/2021; B60R 2011/2022; B60N 2002/905

USPC ...................................................... 296/65.01
See application file for complete search history.

(56) References Cited

U.S. PATENT DOCUMENTS

| | | | |
|---|---|---|---|
| 3,169,781 A * | 2/1965 | Abruzzino | B60R 21/06 297/487 |
| 4,924,814 A * | 5/1990 | Beaudet | A01K 1/0272 280/749 |
| 5,529,341 A * | 6/1996 | Hartigan | B60R 21/06 5/118 |
| 6,779,824 B1 * | 8/2004 | Lazarevich | B60P 1/003 296/37.6 |
| 7,614,689 B2 | 11/2009 | Fowler et al. | |
| 7,766,422 B2 * | 8/2010 | Edwards | B60R 7/005 297/188.01 |
| 9,975,491 B2 | 5/2018 | Morlet Ugalde et al. | |
| D830,116 S * | 10/2018 | Seiders | D7/388 |

(Continued)

FOREIGN PATENT DOCUMENTS

| | | | |
|---|---|---|---|
| DE | 19501316 C1 * | 11/1995 | ............ B60P 7/0876 |
| DE | 102013202840 A1 * | 9/2013 | ............ B60R 7/043 |

(Continued)

*Primary Examiner* — Hilary L Gutman
(74) *Attorney, Agent, or Firm* — Vichit Chea; Price Heneveld LLP

(57) ABSTRACT

A vehicle includes a seating assembly attached to a vehicle interior. A seat is rotationally operable relative to a seatback. A retention device is selectively positionable in a stored position or a cargo storage position and extends between the seatback and a floor area disposed adjacent to the seating assembly. The seat is selectively positionable in a seating position or a stadium position. The retention device in the cargo storage position, the seat in the stadium position, and a floor at least partially define an enclosure configured to secure cargo to the floor and the seat.

18 Claims, 16 Drawing Sheets

(56) References Cited

U.S. PATENT DOCUMENTS

| | | | |
|---|---|---|---|
| 10,343,562 B2 * | 7/2019 | Dry ........................ | B60N 2/32 |
| 2002/0011505 A1 | 1/2002 | Cole et al. | |
| 2006/0022479 A1 | 2/2006 | Mulvihill et al. | |
| 2006/0065687 A1 * | 3/2006 | Reed ...................... | B60P 1/003 |
| | | | 224/404 |
| 2007/0040406 A1 * | 2/2007 | Jovicevic ............. | B60N 2/3047 |
| | | | 296/65.01 |
| 2013/0229045 A1 | 9/2013 | Agustin | |
| 2017/0008460 A1 * | 1/2017 | Rodriguez .............. | B60R 7/043 |
| 2018/0092465 A1 * | 4/2018 | Seibold ................... | B60N 2/22 |

FOREIGN PATENT DOCUMENTS

| | | | | |
|---|---|---|---|---|
| DE | 102020102922 A1 * | 8/2020 | ........... | B60N 2/3047 |
| WO | WO-2011160667 A1 * | 12/2011 | ............. | B60R 11/00 |
| WO | WO-2020198747 A1 * | 10/2020 | ........... | A61G 3/0808 |

* cited by examiner

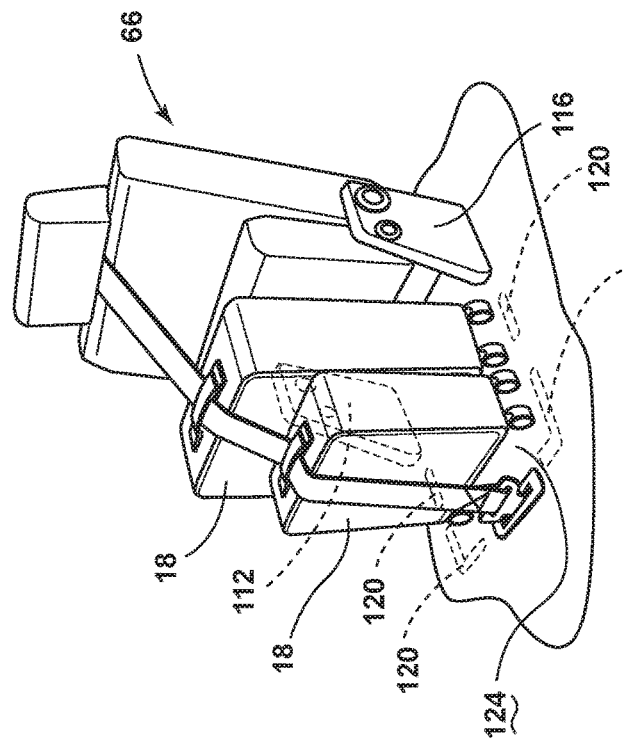
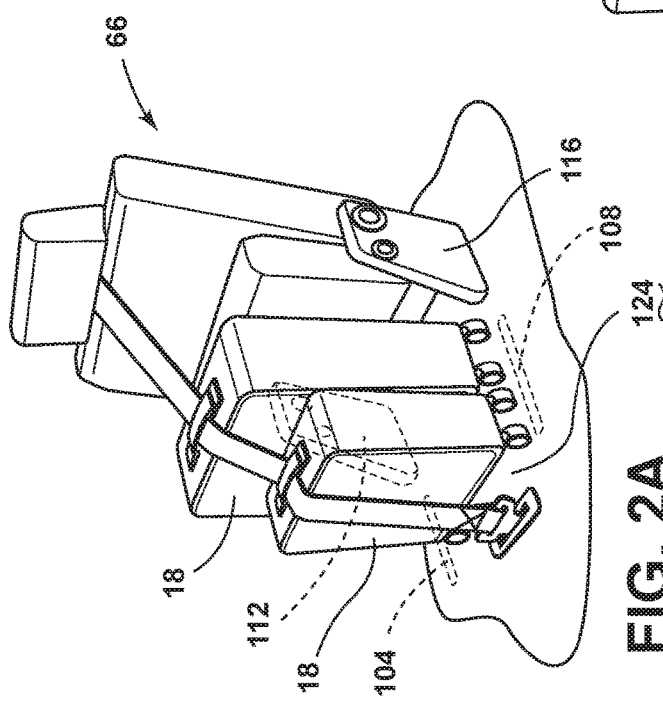
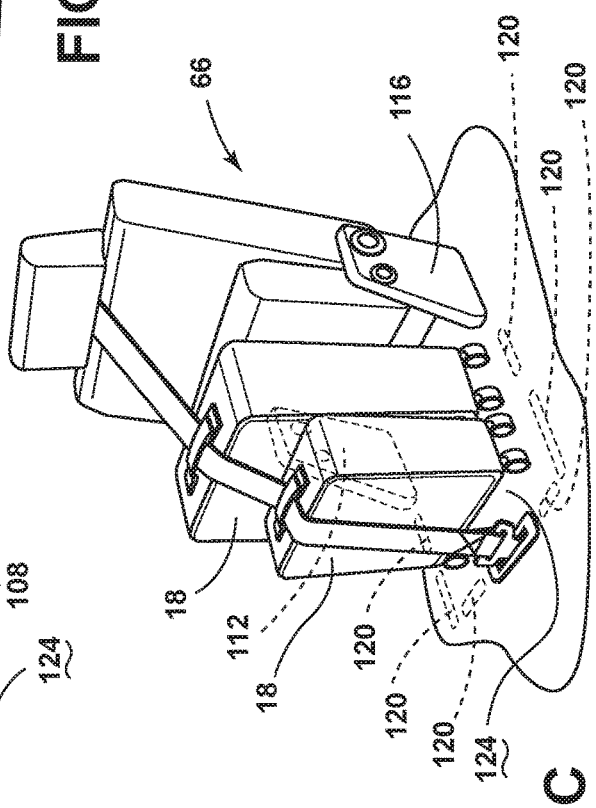
FIG. 2A
FIG. 2B
FIG. 2C

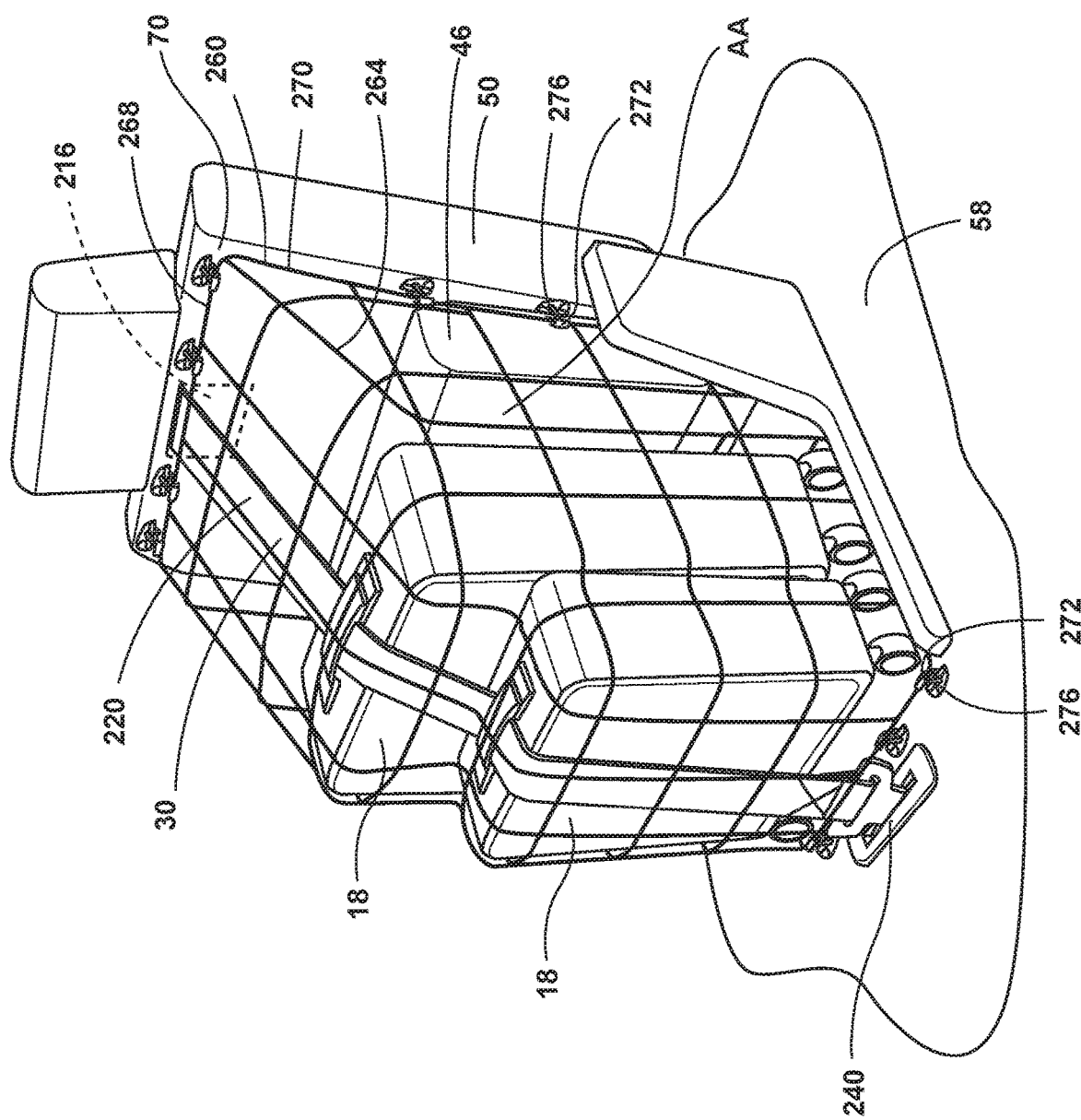

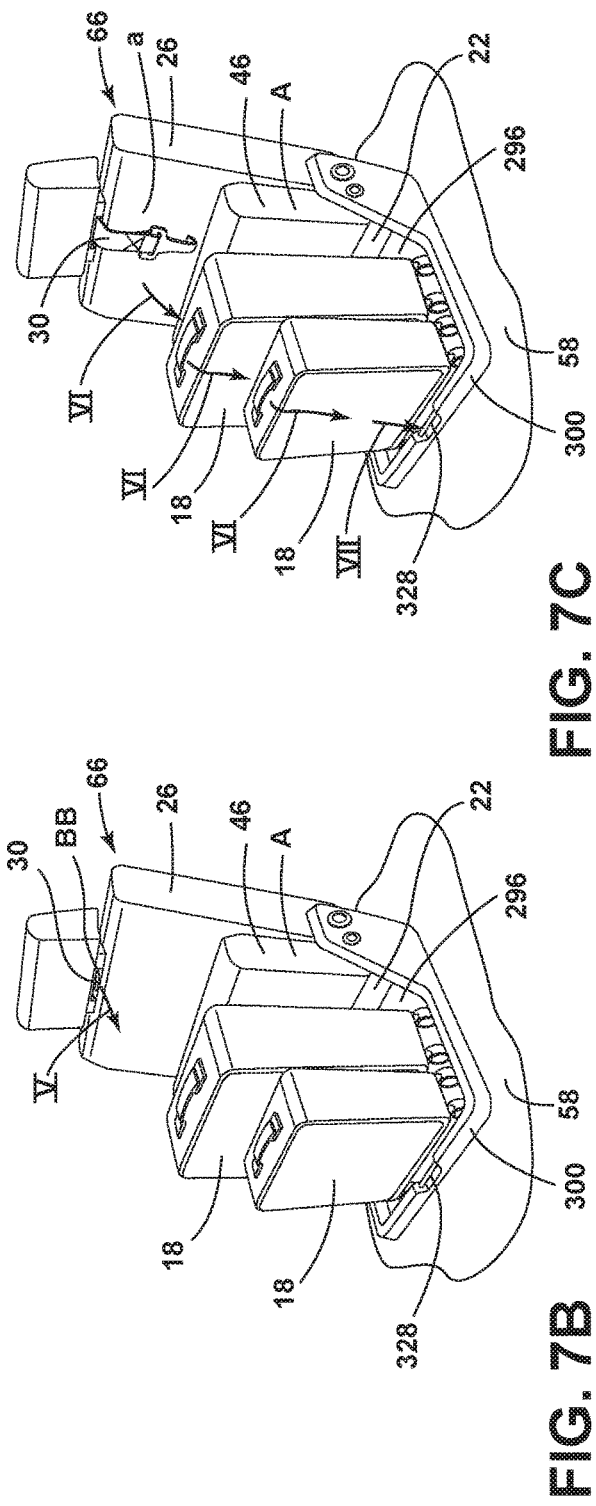
FIG. 7B
FIG. 7C
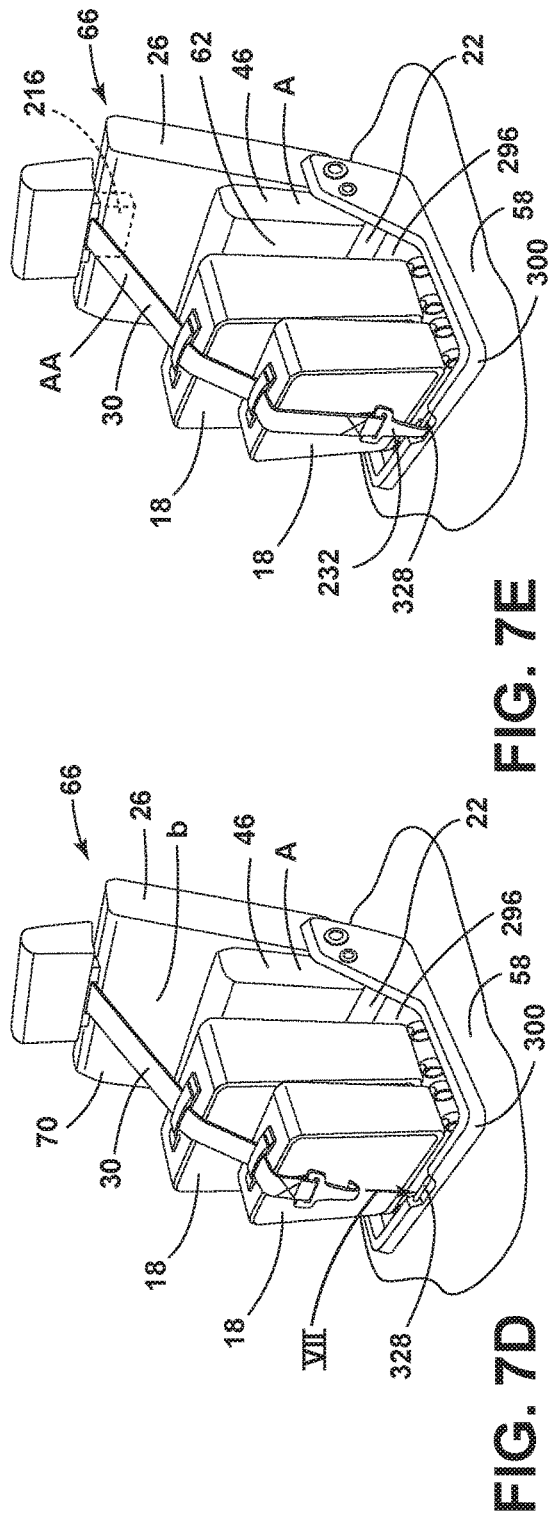
FIG. 7D
FIG. 7E

RETENTION DEVICE FOR VEHICLE SEAT

FIELD OF THE INVENTION

The present invention generally relates to selectively deployable storage enclosures, and more specifically to selectively deployable storage enclosures in vehicles.

BACKGROUND OF THE INVENTION

Storage areas in vehicles have become increasingly important as users seek efficient use of vehicle space. Selectively deployable storage options in a vehicle provide multi-functional vehicle space for changing user needs. Further, it is desirable to provide storage options for vehicle cargo that contain the cargo in standard driving conditions, erratic driving conditions, and during collisions.

SUMMARY OF THE INVENTION

According to a first aspect of the present invention, a vehicle includes a seating assembly attached to a vehicle interior. A seat is rotationally operable relative to a seatback. A retention device is selectively positionable in a stored position or a cargo storage position and extends between the seatback and a floor area disposed adjacent to the seating assembly. The seat is selectively positionable in a seating position or a stadium position. The retention device in the cargo storage position, the seat in the stadium position, and a floor at least partially define an enclosure configured to secure cargo to the floor and the seat.

Embodiments of the first aspect of the invention can include any one or a combination of the following features:
- the retention device includes a strap;
- the strap is secured to a retraction mechanism;
- the retraction mechanism is disposed in the seatback;
- the retraction mechanism is disposed in the floor area;
- a free end of the strap is selectively releasable from the retraction mechanism and wherein a free end of the strap is configured to be received by a slot in the floor area;
- the strap is selectively releasable from the retraction mechanism and wherein a free end of the strap is configured to be received by a slot in the seatback;
- a tray is disposed on the floor;
- the tray includes a raised edge disposed around a perimeter of the tray;
- the tray includes a striker for coupling a free end of the strap to the tray;
- first and second cargo positioners disposed on the floor;
- the retention device includes a cover extending between the seatback and the floor;
- the cover is contained in the seatback in the stored position; and
- the cover is secured to the edge portion of the seatback and the floor in the cargo storage position.

According to a second aspect of the present invention, a seating assembly includes a seat selectively positionable in one of a seating position and a stadium position. The seating assembly includes a seatback. A retention device is coupled to the seatback. The retention device is selectively deployable from a stored position to a cargo storage position. The retention device in the cargo storage position defines an enclosure at least partially defined by the seat and a floor.

Embodiments of the second aspect of the invention can include any one or a combination of the following features:
- the retention device in the cargo storage position defines an enclosure at least partially defined by the seat in the stadium position and the floor;
- an exposed length of the retention device is selectively adjustable; and
- the retention device includes a retraction mechanism and wherein the retention device is contained in the retraction mechanism when the retention device is in the stored position.

According to a third aspect of the present invention, a vehicle storage system includes a seating assembly having a seat, a seatback, and a floor. A retention device is positionable between an upper portion of the seatback and an area of the floor disposed proximate the seating assembly. The retention device is selectively extendable from at least one of the upper portion of the seatback and the area of the floor disposed proximate the seating assembly.

Embodiments of the third aspect of the invention can include any one or a combination of the following features:
- the retention device is selectively retractable into at least one of the corresponding upper portion of the seatback and the area of the floor disposed proximate the seating assembly.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2A is a perspective view of a seating assembly with a seat in the stadium position and a retention device in the cargo storage position with first and second cargo positioners;

FIG. 2B is a perspective view of a seating assembly with a seat in the stadium position and a retention device in the cargo storage position with various cargo positioners;

FIG. 2C is a perspective view of a seating assembly with a seat in the stadium position and a retention device in the cargo storage position with various cargo positioners;

FIG. 4 is a perspective view of a seating assembly with a seat in the stadium position and a retention device including cable netting in a cargo storage position;

FIG. 7B is a perspective view of the seating assembly of FIG. 7A with a seat in the stadium position and a retention device in a stored position;

FIG. 7C is a perspective view of the seating assembly of FIG. 7A with a seat in the stadium position and a retention device in a first partially deployed position;

FIG. 7D is a perspective view of the seating assembly of FIG. 7A with a seat in the stadium position and a retention device in a second partially deployed position;

FIG. 7E is a perspective view of a seating assembly of FIG. 7A with a seat in the stadium position and a retention device in the cargo storage position;

DETAILED DESCRIPTION

Figure 1:
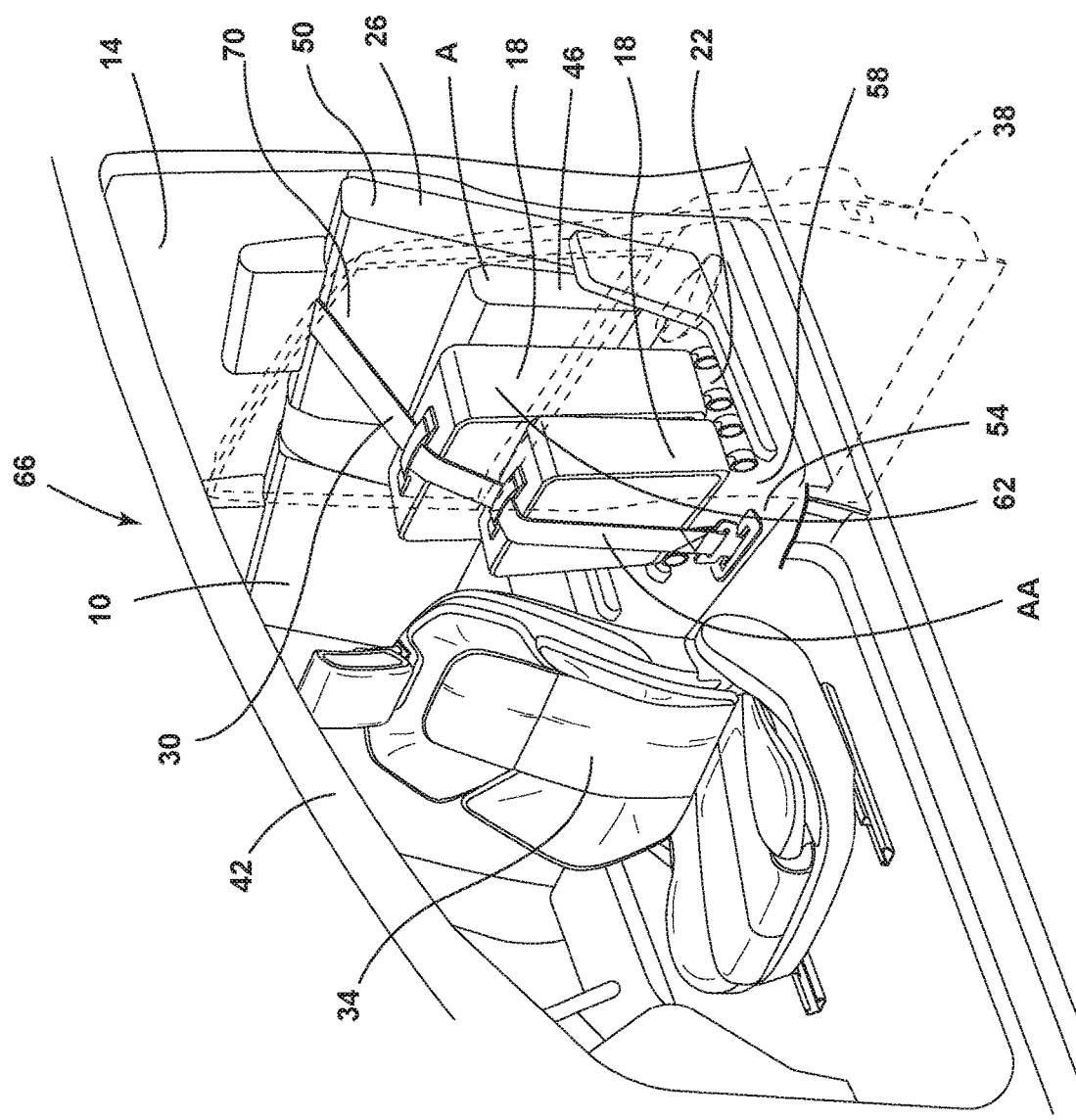
FIG. 1 is a perspective view of a vehicle interior with a seating assembly in a stadium position and a retention device in a cargo storage position, according to an embodiment.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary aspects of the inventive concepts defined in the appended claims. Hence, specific dimensions and other physical characteristics relating to the aspects disclosed herein are not to be considered as limiting, unless the claims expressly state otherwise.

Referring to FIG. 1, a passenger compartment 10 of a vehicle interior 14 is shown. Luggage pieces 18 are shown in a cargo storage area 22 within the passenger compartment 10. The cargo storage area 22 may be defined by at least a seating assembly 26 with a retention device 30. The seating assembly 26 with the retention device 30 is shown behind the seating assembly 34 of the driver. The location of the cargo storage area 22 behind the seating assembly 34 of the driver may allow for convenient access to the cargo storage area 22 through a rear door 38 of the vehicle 42. The seating assembly 26 may include a seat 46 and a seatback 50. The seat 46 is shown in the stadium position A, and the retention device 30 is shown in the cargo storage position AA.

Referring to FIGS. 1-10, a vehicle 42 includes a seating assembly 26 attached to a vehicle interior 14. The seating assembly 26 includes a seat 46 that is rotationally operable relative to a seatback 50. A retention device 30 is selectively positionable in a stored position BB or a cargo storage position AA. The retention device 30 extends between the seatback 50 and a floor area 54 disposed adjacent to the seating assembly 26. The seat 46 is selectively positionable in a seating position B or a stadium position A. The retention device 30 in the cargo storage position AA, the seat 46 in the stadium position A, and the floor 58 at least partially define an enclosure 62 configured to secure cargo (for example, luggage pieces 18) to the floor 58 and the seat 46.

Referring again to FIGS. 1-10, a vehicle storage system 66 includes a seating assembly 26. The seating assembly 26 includes a seat 46 and a seatback 50. The vehicle storage system 66 also includes a floor 58 and a retention device 30 positionable between an upper portion 70 of the seatback 50 and a floor area 54 disposed proximate the seating assembly 26. The retention device 30 is selectively extendable from at least one of the upper portion 70 of the seatback 50 and a floor area 54 disposed proximate the seating assembly 26. In the stored position BB, the retention device 30 may be integrated with the seat 46 or the floor 58.

With reference again to FIG. 1, in certain conditions, it may be desirable to store cargo securely within a passenger compartment 10 of a vehicle interior 14. Users may want their cargo to be confined to one location during standard driving conditions, erratic driving conditions, and dynamic events such as collisions. Minimally secured and unsecured cargo may move within a passenger compartment 10 of a vehicle interior 14. During standard driving conditions, erratic driving conditions, and dynamic events such as collisions, passengers and minimally secured and unsecured cargo may unintentionally interact or make contact. Accordingly, providing a retention device 30 that is selectively deployable to form an enclosure 62 as generally set forth in FIGS. 1-10 may provide a generally confined space for cargo and thus may provide a safer, more pleasant traveling experience for a vehicle occupant.

Figure 2:
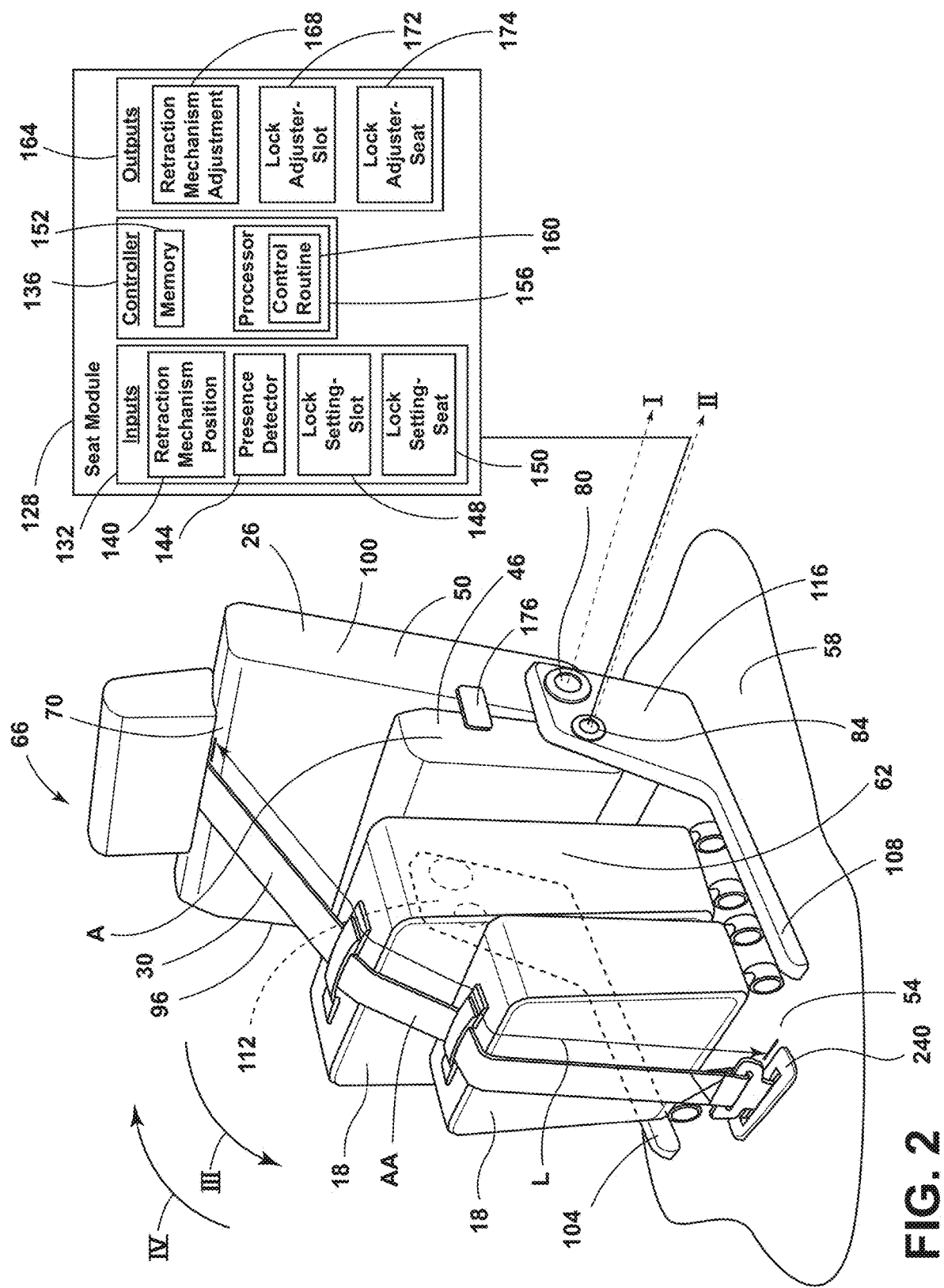
FIG. 2 is a perspective view of the seating assembly of FIG. 1 with a seat in the stadium position and a retention device in the cargo storage position.
Figure 3A:
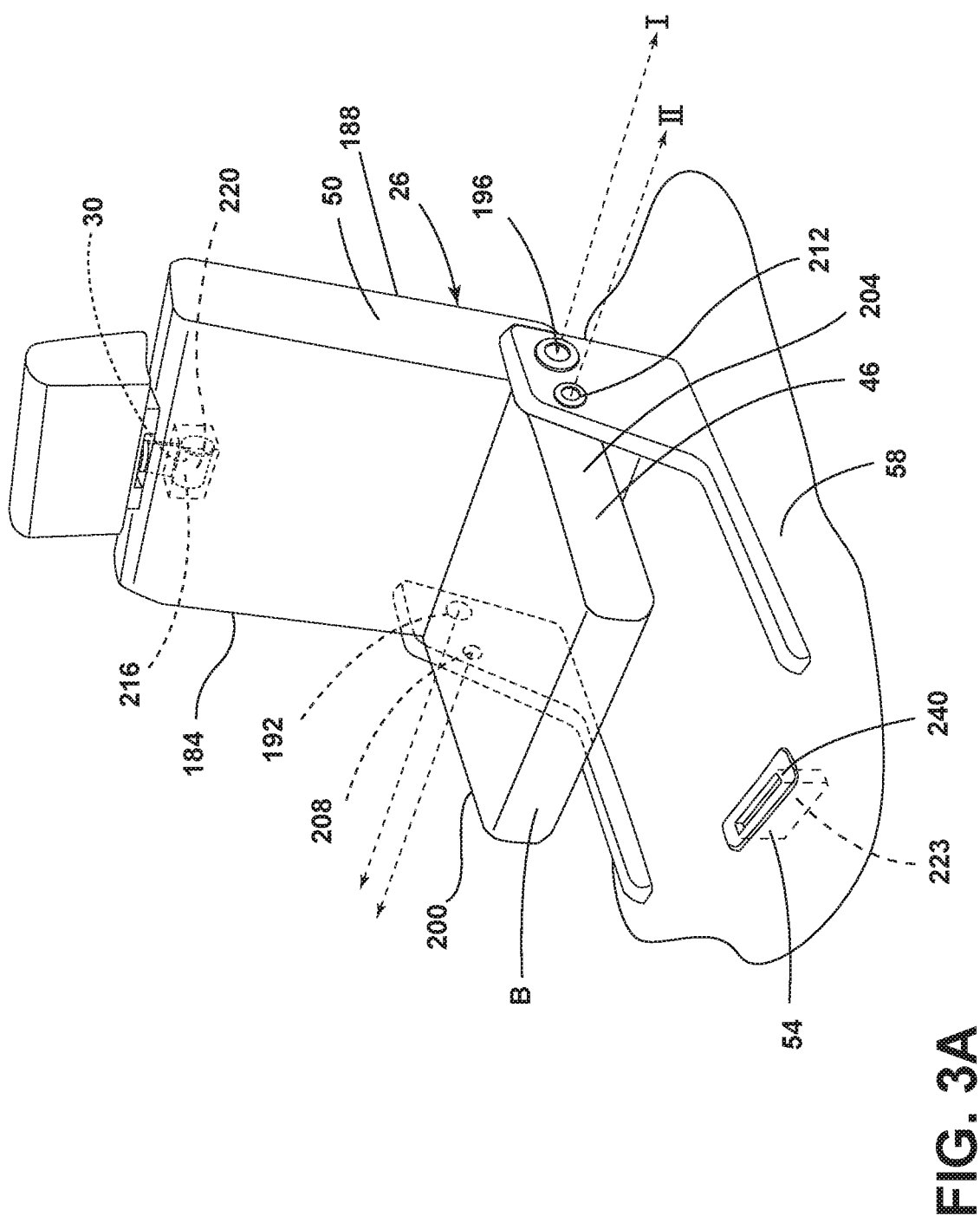
FIG. 3A is a perspective view of a seating assembly with a seat in a seating position and a retention device in a stored position.

Referring now to FIG. 2, the seating assembly 26 is shown with the seat 46 in a stadium position A. The stadium position A may also be referred to as a substantially vertical position of the seat 46. The seatback 50 is shown in the substantially vertical position. The retention device 30 is shown in the cargo storage position AA. The seating assembly 26 may be coupled to the floor 58. The seating assembly 26 may include a first pivot point 80 and a second pivot point 84. The seatback 50 may pivot about a first axis I extending through a first pivot point 80. The seat 46 may pivot about a second axis II extending through a second pivot point 84. The seat 46 may be rotated in the direction shown by arrow III from the stadium position A to a seating position B (FIG. 3A). The seat 46 may be rotated in the direction shown by arrow IV from the seating position B (FIG. 3A) to a stadium position A.

With continued reference to FIG. 2, the seating assembly 26 may include a first side 96 and a second side 100. A first cargo positioner 104 may be disposed on a first side 96 of the seating assembly 26. A second cargo positioner 108 may be disposed on a second side 100 of the seating assembly 26. In various examples, the first cargo positioner 104 and the second cargo positioner 108 may be integral with a first mounting member 112 and a second mounting member 116 for securing the seating assembly 26 to the floor 58. In other examples, as shown in FIG. 2A, the first and second cargo positioners 104, 108 may be separate from the respective first mounting member 112 and the respective second mounting member 116. In another example, cargo positioners 120 may be arranged in a variety of configurations shown in FIGS. 2B-2C. As such, cargo positioners 120 may reduce the likelihood of movement of cargo (for example luggage pieces 18) outside a designated floor area 124 generally defined by the cargo positioners 120.

Referring again to FIG. 2, the seating assembly 26 may be in communication with a seat module 128 that includes controls for operation of the seating assembly 26. The seat module 128 may receive inputs 132 that may be in communication with a controller 136. The inputs 132 may include a retraction mechanism position 140, a cargo presence detector 144, a lock setting 148 for the slot 240, and a lock setting 150 for a lock 176 disposed on the seat 46. The controller 136 may include a memory 152 and a processor 156. The processor 156 may execute a control routine 160 to regulate operation of the seating assembly 26. The controller 136 may be in communication with outputs 164. The outputs 164 may include a retraction mechanism adjustment 168, a lock adjuster 172 for the slot 240 and a lock adjuster 174 for the seat 46. A lock 176 for securing the seat 46 in a stadium position A may secure the seat 46 to the seatback 50.

Referring to FIGS. 3A-3E, the steps for securing cargo in the enclosure 62 are shown. Referring to FIG. 3A, the seating assembly 26 is shown with the seat 46 in the seating position B and the seatback 50 in the substantially vertical position. The seatback 50 may include a first side 184 and a second side 188. The first axis I of rotation may extend through a first attachment location 192 disposed on a first side 184 of the seatback 50 and a second attachment location 196 disposed on a second side 188 of the seatback 50. The seat 46 may include a first side 200 and a second side 204. A second axis II of rotation may extend through a first attachment point 208 disposed on a first side 200 of the seat 46 and a second attachment point 212 disposed on a second side 204 of the seat 46. A retraction mechanism 216 may be disposed in the seatback 50. In the example shown, the retention device 30 may be stored within the retraction mechanism 216 disposed in the seatback 50. In the example shown, the retention device 30 may include a strap 220 and an attachment piece. The strap 220 may be wound around a spool 222 disposed in the retraction mechanism 216.

Referring to FIGS. 3A-3E, the strap 220 may include a first end 224 and a second end 228. The first end 224 of the strap 220 may be secured to a retraction mechanism 216. The second end 228 of the strap 220 may be a free end. The attachment piece may be secured to a free end of the strap 220. The attachment piece may be a tether 232, tongue 236 (FIG. 3C), or other attachment piece. A slot 240 may be disposed in the floor 58. The slot 240 may be configured to receive a tether 232, a tongue 236, or other attachment piece coupled to a free end (second end 228) of the retraction mechanism 216. A lock mechanism 223 may be disposed in the slot 240 to secure the tether 232, the tongue 236, or other attachment piece in the slot 240.

Figure 3B:
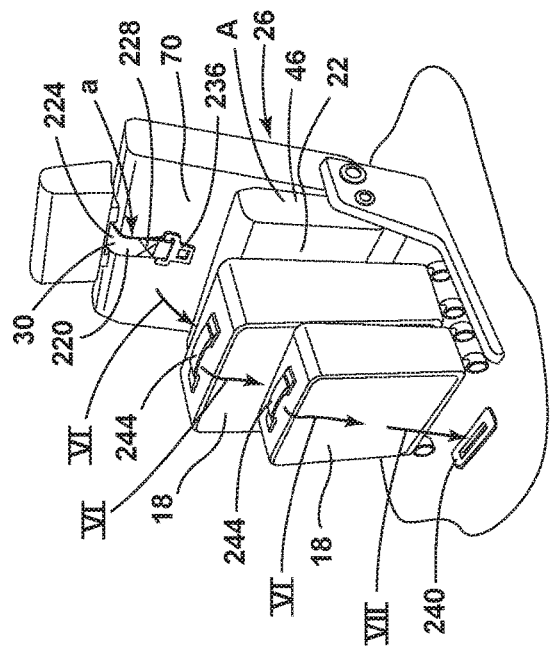
FIG. 3B is a perspective view of the seating assembly of FIG. 3A with a seat in the stadium position and a retention device in the stored position.

Referring now to FIG. 3B, the seating assembly 26 of FIG. 3A is shown with the seat 46 in the stadium position A and luggage pieces 18 disposed in the cargo storage area 22. The luggage pieces 18 may be disposed between first and second cargo positioners 104, 108. Arrow V shows the direction in which the retention device 30 may be deployed from the retraction mechanism 216 disposed in the upper portion 70 of the seatback 50.

Figure 3C:
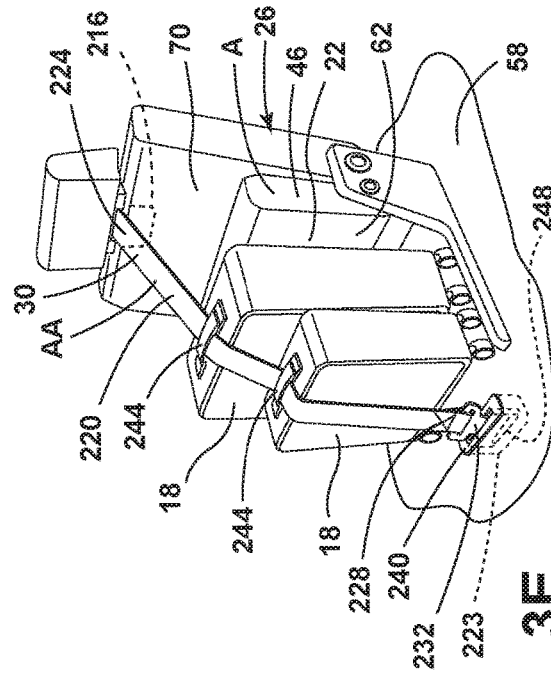
FIG. 3C is a perspective view of the seating assembly of FIG. 3A with a seat in the stadium position and a retention device in a first partially deployed position.

Referring now to FIG. 3C, the seating assembly 26 of FIG. 3A is shown with the retention device 30 in a first partially deployed position a. As previously explained, the retention device 30 may include a strap 220 and a tether 232. In various examples, as previously discussed, the free end (second end 228) may be secured to a tongue 236. Arrows VI show the direction in which the retention device 30 may be routed through handles 244 in the luggage pieces 18 and into the slot 240.

Figure 3D:
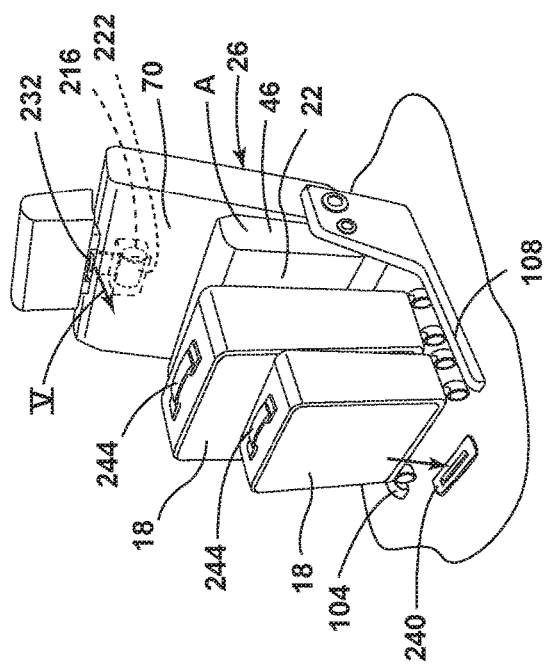
FIG. 3D is a perspective view of the seating assembly of FIG. 3A with a seat in the stadium position and a retention device in a second partially deployed position.

Referring now to FIG. 3D, the seating assembly 26 of FIG. 3A is shown with the retention device 30 in a second partially deployed position b. Arrow VII shows the movement of the tether 232 into the slot 240.

Figure 3E:
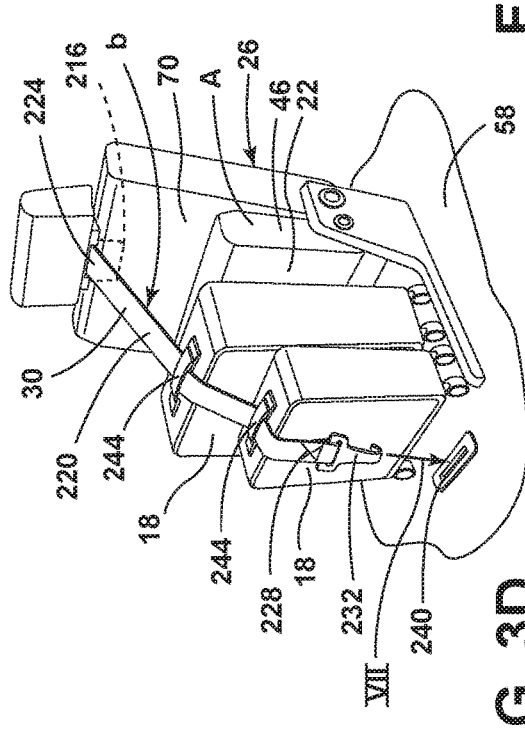
FIG. 3E is a perspective view of the seating assembly of FIG. 3A with a seat in the stadium position and a retention device in the cargo storage position.

Referring now to FIG. 3E, the seating assembly 26 of FIG. 3A is shown with a retention device 30 in a cargo storage position AA. That is, the tether 232 may be secured to a striker 248 or other member disposed in the slot 240. As such, in the example shown the retention device 30 may secure the luggage pieces 18 to the seat 46 and the floor 58.

With reference to FIG. 3E, the retraction mechanism 216 may be set in various positions including an unlocked position, a locked position, and a spooling position. In the unlocked position, the strap 220 may freely spool in and out of the retraction mechanism 216. In the locked position, the strap 220 may have a fixed exposed length L (FIG. 2). In the pre-tensioned position, the strap 220 may have a retracted exposed length L. The fixed exposed length L may be longer than the retracted exposed length L. The retraction mechanism 216 may be in the unlocked position while cargo is arranged in cargo storage area 22. The retraction mechanism 216 may be in the locked position when the retention device 30 is in the slot 240. The retraction mechanism 216 may be in the pre-tensioned position when a dynamic event such as a vehicle collision occurs. As such, the position of the retraction mechanism 216 may at least partially determine the exposed length L of the strap 220. Additionally, the exposed length L of the strap 220 may be at least partially determined by the size of the cargo disposed in the cargo storage area 22.

With continued reference to FIG. 3E and with reference to the seat module 128 of FIG. 2, the slot 240 may include a lock mechanism 223 having a lock setting 148 for regulating the engagement of the tether 232, tongue 236, or other attachment piece and the slot 240. The seat 46 may include a lock setting 150 for regulating the lock 176 for securing the seat 46 in the stadium position A.

With reference to FIGS. 1-10, it is to be understood that the retention devices 30 disclosed herein may secure various cargo (including, for example, boxes, bags, crates, cages, strollers, camping equipment) to the seat 46 and the floor 58. It is to be understood that the retention devices 30 disclosed may extend around cargo and may not be limited to retention devices 30 that may extend through cargo portions (for example handles 244 of luggage pieces 18).

Figure 4A:
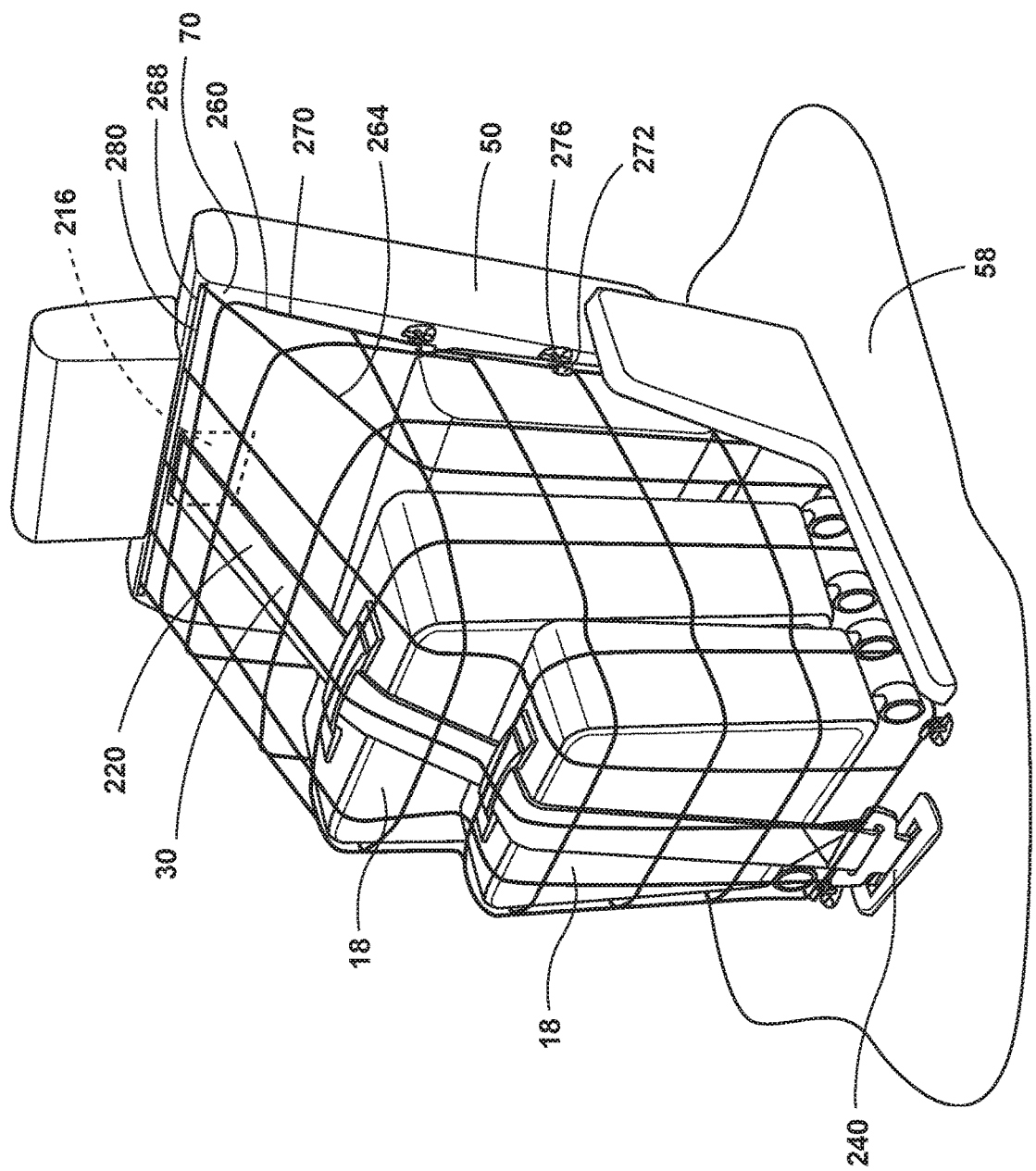
FIG. 4A is a perspective view of a seating assembly with a seat in the stadium position and another example of a retention device including cable netting in the cargo storage position.
Figure 5:
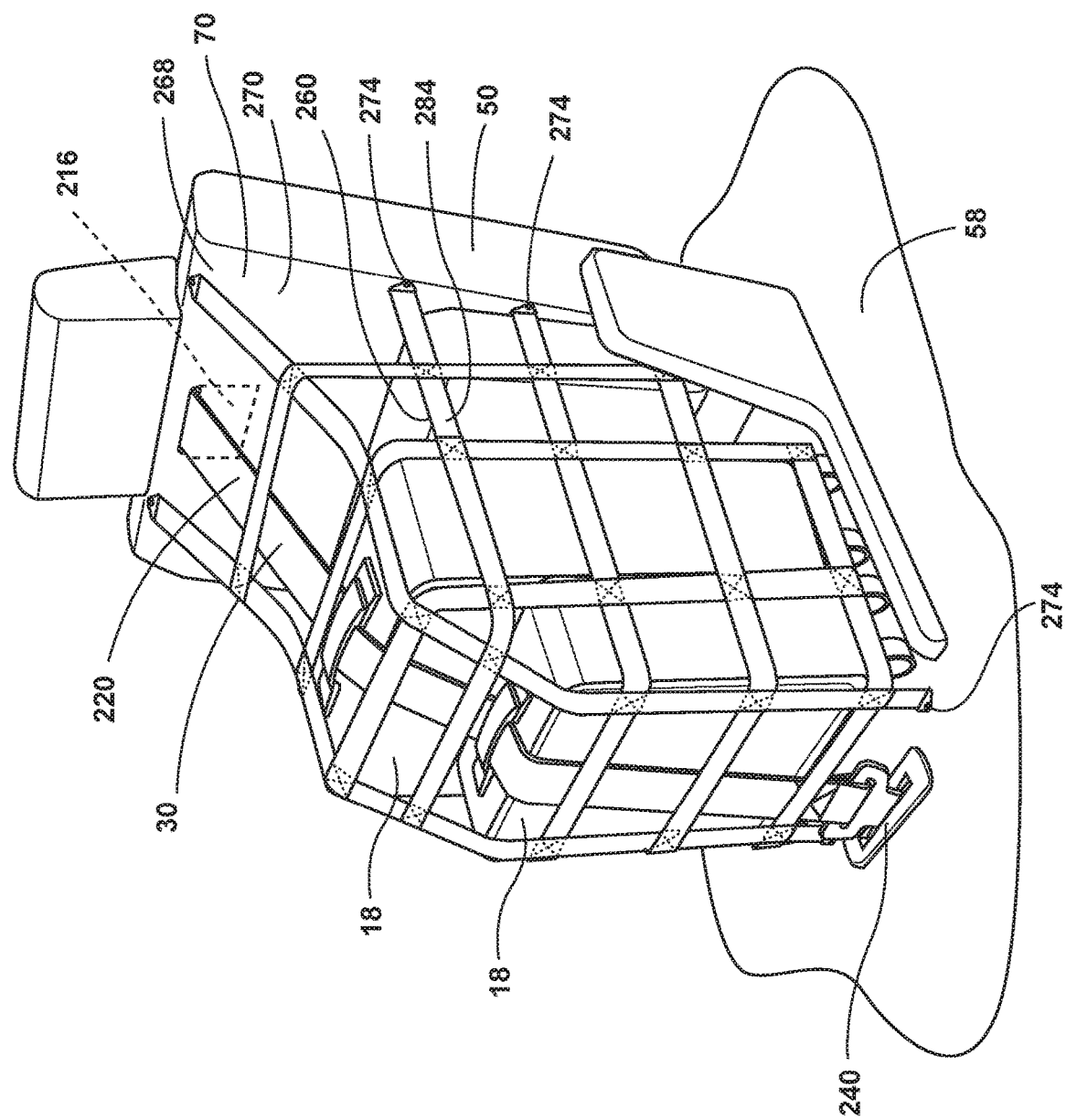
FIG. 5 is a perspective view of a seating assembly with a seat in the stadium position and a retention device including straps in the cargo storage position.
Figure 6:
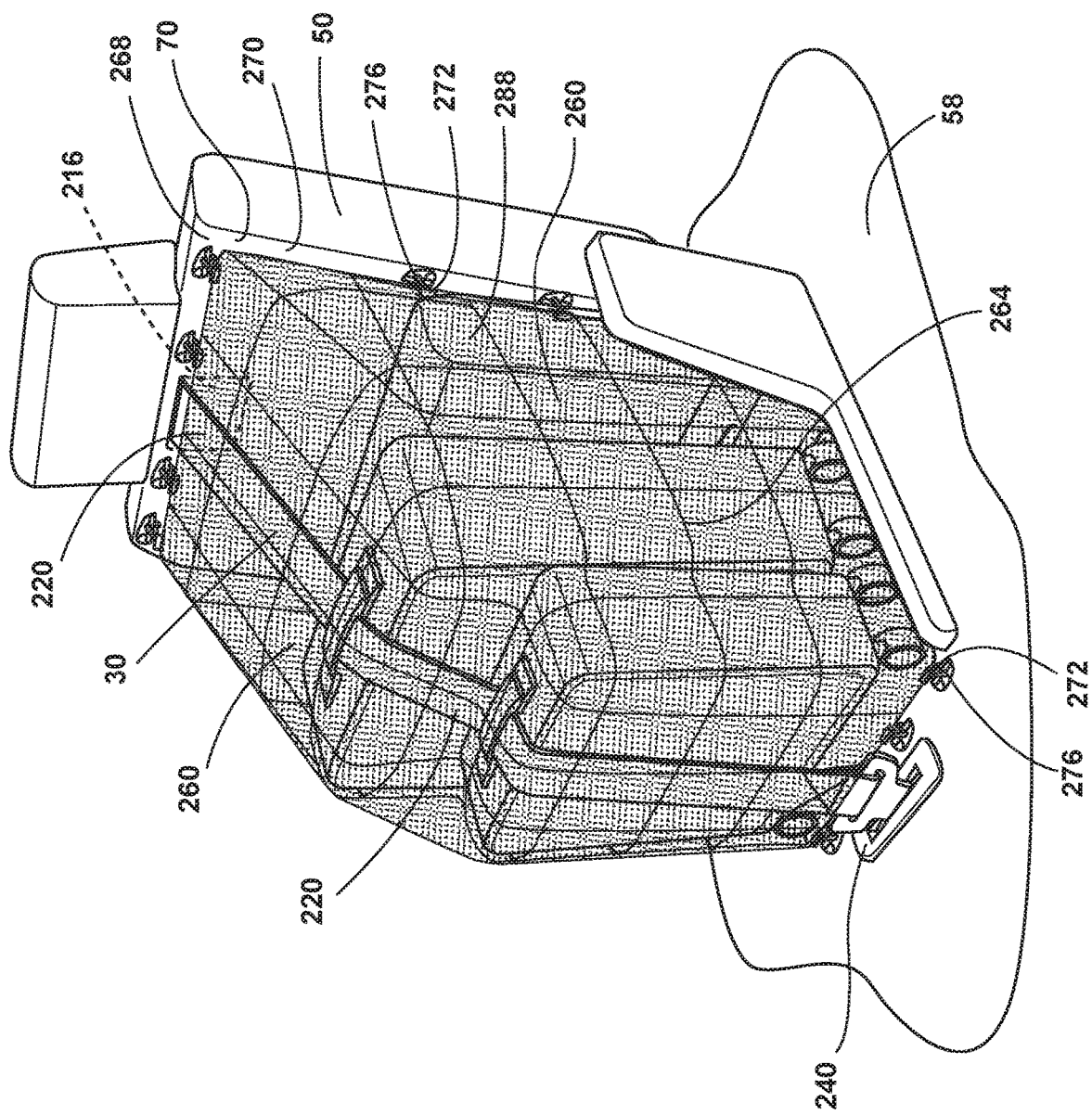
FIG. 6 is a perspective view of a seating assembly with a seat in the stadium position and a retention device including a mesh material in the cargo storage position.

Referring now to FIGS. 4-6, various retention device 30 examples are shown. With reference to FIG. 4, one retention device 30 may include a cover 260 and may be in the cargo storage position AA. The cover 260 may be made of cable netting 264. In the cargo storage position AA, the cover 260 may extend from a top edge 268 of the seatback 50 to the floor 58. The cover 260 may include fasteners that may be affixed to attachment locations disposed around a perimeter 270 of the seatback 50 and on the floor 58. In some examples, the fasteners may be loops or hooks 272. In some examples, the attachment locations may include hooks or strikers 276. In various examples, the cover 260 may be stored proximate the retraction mechanism 216 for the strap 220. In various examples, the cover 260 may be stored in and may be deployed from an elongated aperture 280 disposed adjacent to the retraction mechanism 216. (FIG. 4A) As such, when the strap 220 is pulled from the top edge 268 of the seatback 50, the cover 260 may also be pulled from the elongated aperture 280 disposed in the top edge 268 of the seatback 50.

Figure 5A:
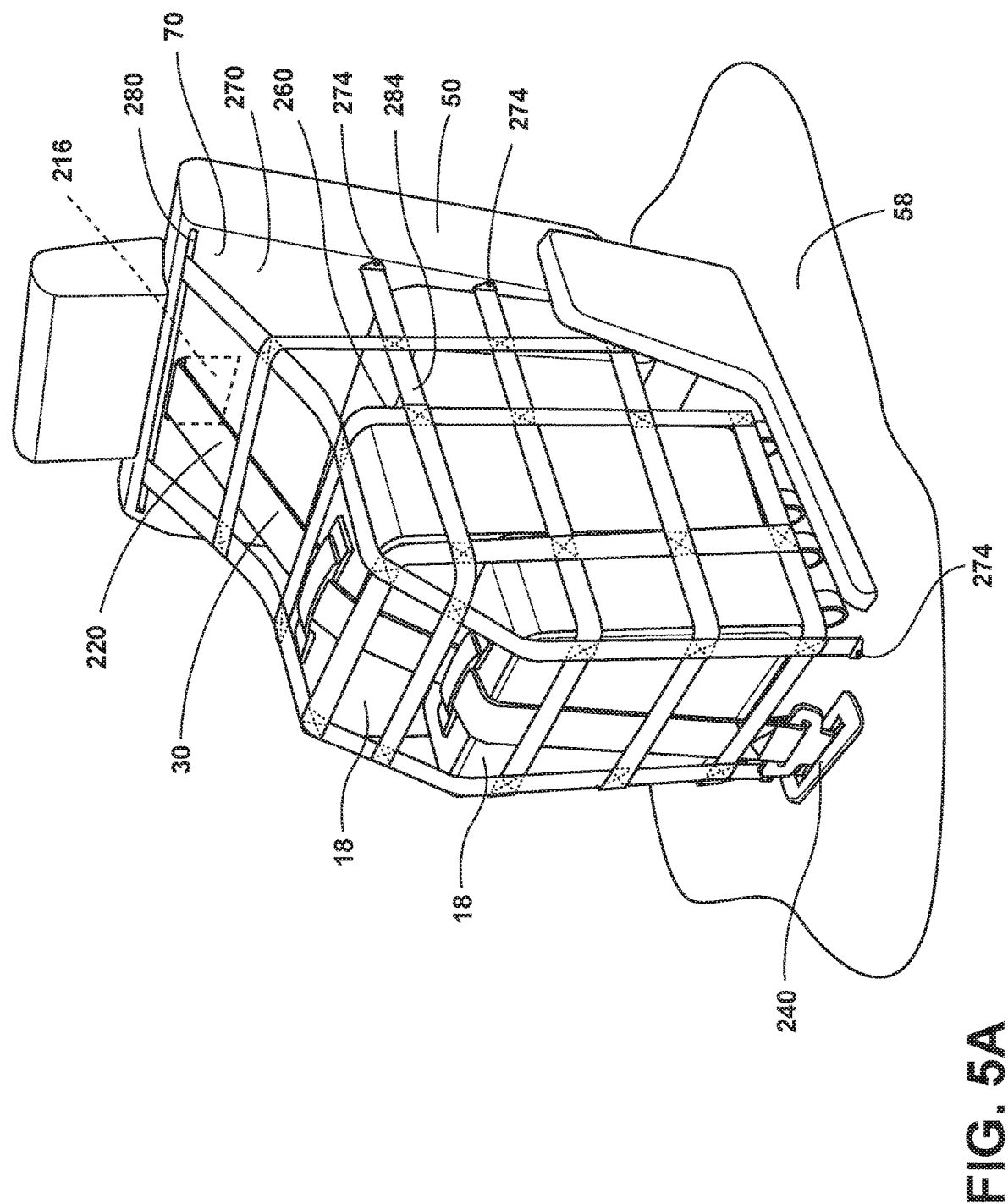
FIG. 5A is a perspective view of a seating assembly with a seat in the stadium position and another example of a retention device including straps in the cargo storage position.

Referring to FIG. 5, another example of a retention device 30 may include a cover 260 made of straps 284. In the cargo storage position AA, the cover 260 may extend from a top edge 268 of the seatback 50 to the floor 58. The cover 260 may include fasteners that may be affixed to attachment locations that may be disposed around a perimeter 270 of the seatback 50 and on the floor 58. In some examples, the fasteners may be buttons 274. In various examples, the cover 260 may be stored proximate the retraction mechanism 216 for the strap 220. In various examples, the cover 260 may be stored in and may be deployed from an elongated aperture 280 disposed adjacent to the retraction mechanism 216 (FIG. 5A). As such, when the strap 220 is pulled from the top edge 268 of the seatback 50, the cover 260 may also be pulled from the top edge 268 of the seatback 50.

Figure 6A:
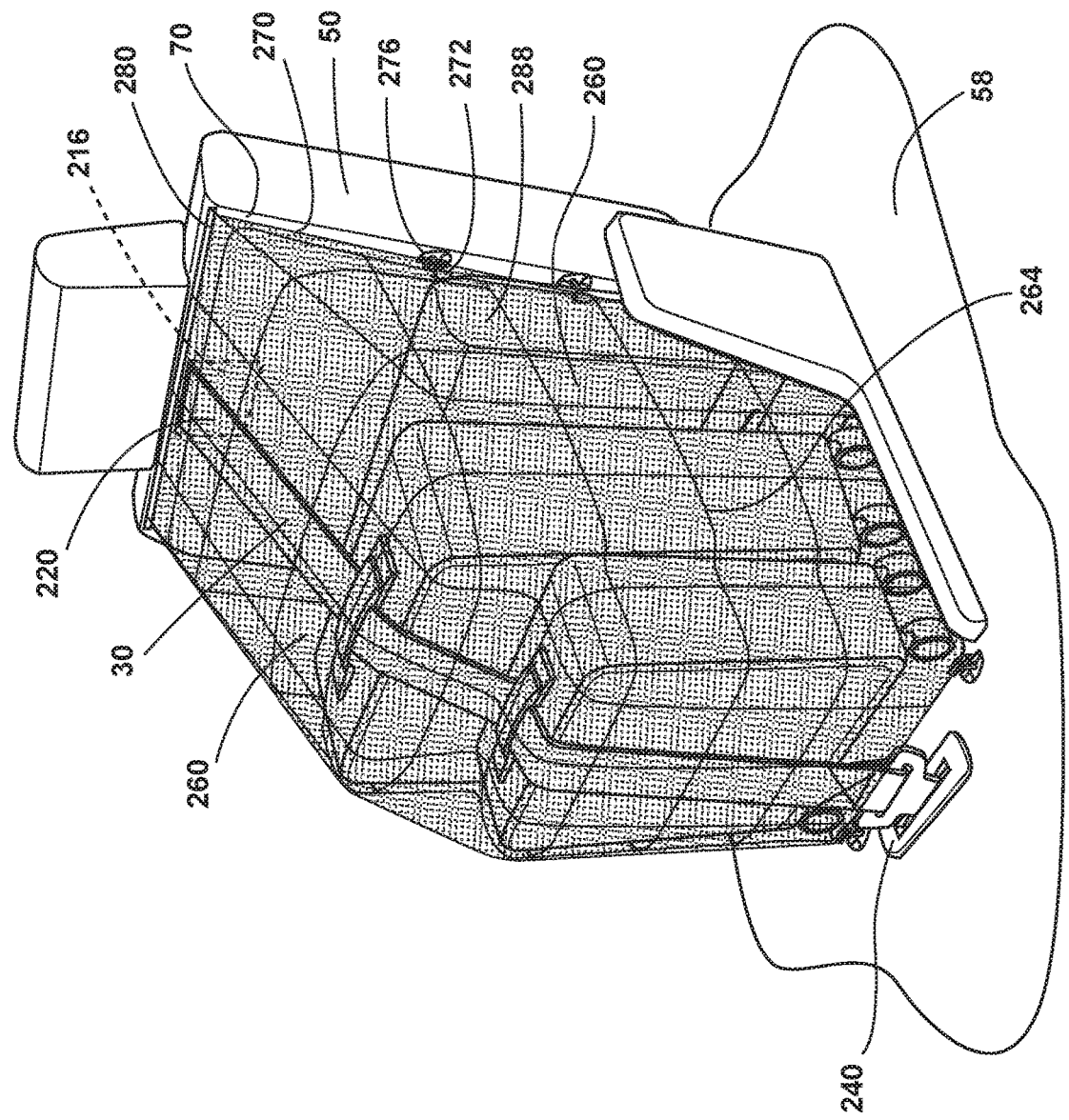
FIG. 6A is a perspective view of a seating assembly with a seat in the stadium position and another example of a retention device including mesh material in the cargo storage position.

Referring to FIG. 6, another example of a retention device 30 may include a cover 260 made of a mesh material 288 disposed over cable netting 264. In the cargo storage position AA, the cover 260 may extend from a top edge 268 of the seatback 50 to the floor 58. The cover 260 may include fasteners that may be affixed to attachment locations that may be disposed around a perimeter 270 of the seatback 50 and the floor 58. In some examples, the fasteners may be loops or hooks 272. In some examples, the attachment locations may include hooks or strikers 276. In various examples, the cover 260 may be proximate the retraction mechanism 216 for the strap 220. In various examples, the cover 260 may be stored in and may extend from an elongated aperture 280 disposed adjacent to the retraction mechanism 216. (FIG. 6A) As such, when the strap 220 is pulled from the top edge 268 of the seatback 50, the cover 260 may also be pulled from the top edge 268 of the seatback 50.

With reference again to FIGS. 4-6, it is to be understood that the strap 220 and the covers 260 may extend from the top edge 268 of the seatback 50 and other locations. In various examples, the strap 220 and the covers 260 may extend from an upper portion 70 or other area of the seatback 50.

Referring to FIGS. 7A-7E, an example of the vehicle storage system 66 is shown with a tray 296. FIGS. 7A-7E show the steps of securing cargo in the enclosure 62 defined by the seat 46, the retention device 30, the floor 58, and the tray 296 disposed on the floor 58.

Figure 7A:
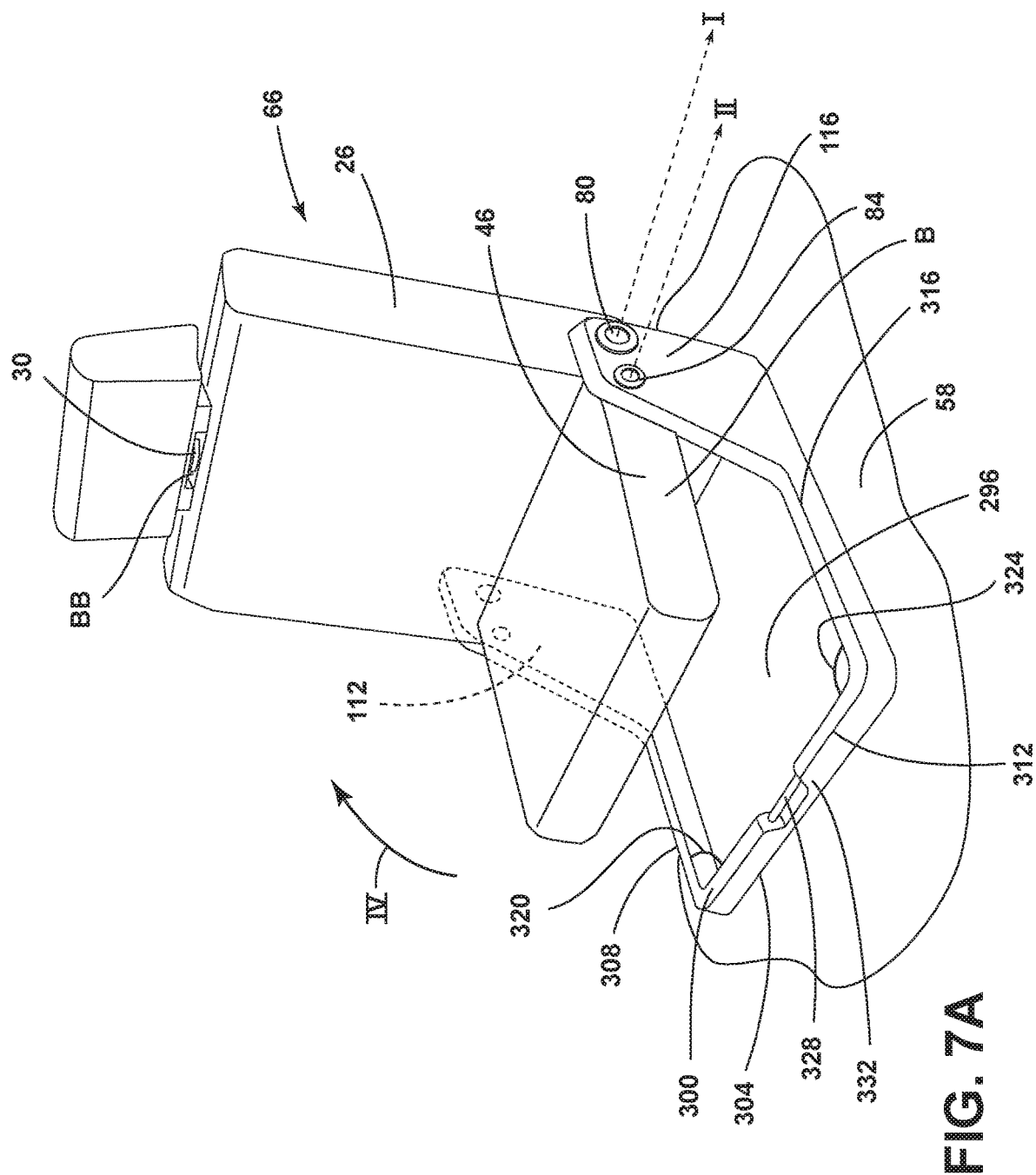
FIG. 7A is a perspective view of a seating assembly with a seat in the seating position and a retention device in the stored position, according to another example.

Referring to FIG. 7A, the tray 296 may be integral with a first mounting member 112 and a second mounting member 116. The first mounting member 112 and the second mounting member 116 may secure the seating assembly 26 to the floor 58. The tray 296 may extend away from the first and second mounting members 112, 116 and between the first and second mounting members 112, 116. The tray 296 may include a raised edge 300. The raised edge 300 may be disposed around a perimeter portion 304 of the tray 296. The raised edge 300 may include a first portion 308, a second portion 312, and a third portion 316. The first portion 308 of the raised edge 300 may extend away from the first mounting member 112. A second portion 312 of the raised edge 300 may be disposed transverse to the first portion 308 of the raised edge 300. A first bend angle 320 may be disposed between the first portion 308 of the raised edge 300 and the second portion 312 of the raised edge 300. The first bend angle 320 may be approximately 90 degrees. A third portion 316 of the raised edge 300 may be transverse to the second portion 312 of the raised edge 300. A second bend angle 324 may be disposed between the second portion 312 of the raised edge 300 and the third portion 316 of the raised edge 300. The second bend angle 324 may be approximately 90 degrees. A striker 328 may be disposed in a central portion 332 of the second portion 312 of the raised edge 300. The striker 328 may be configured to receive the retention device 30.

With continued reference to FIG. 7A and as previously explained relative to FIG. 3A, the first axis I and the second axis II may extend through the respective first and second pivot points 80, 84. The seat 46 may be moved around the second axis II from the seating position B to the stadium position A (FIG. 7B) in the direction shown by arrow IV. The retention device 30 is shown in the stored position BB.

Referring to FIG. 7B, the seating assembly 26 of FIG. 7A is shown with luggage pieces 18 in the cargo storage area 22. Arrow V shows the direction that the retention device 30 may deploy from the seatback 50. The luggage pieces 18 are shown on the tray 296 and within the raised edge 300 of the tray 296. The retention device 30 is shown in the stored position BB.

With reference to FIG. 7C, the seating assembly 26 of FIG. 7A is shown with the retention device 30 in a first partially deployed position a. The retention device 30 may extend from the upper portion 70 of the seatback 50. Arrows VI depict the direction in which the retention device 30 will be extended to secure the luggage pieces 18 to the tray 296.

Referring now to FIG. 7D, the seating assembly 26 of FIG. 7A is shown with the retention device 30 in a second partially deployed position b. The retention device 30 may extend from an upper portion 70 of the seatback 50. Arrow VII depicts the direction in which the retention device 30 will be extended to the striker 328 to secure the luggage pieces 18 to the tray 296.

With reference to FIG. 7E, the retention device 30 of FIG. 7A is shown in the cargo storage position AA. The tether 232 has been attached to the striker 328 of the tray 296. As previously explained relative to FIGS. 3A-3E, the retraction mechanism 216 may be positioned in the spooling, locked, and pre-tensioned positions.

Figure 8:
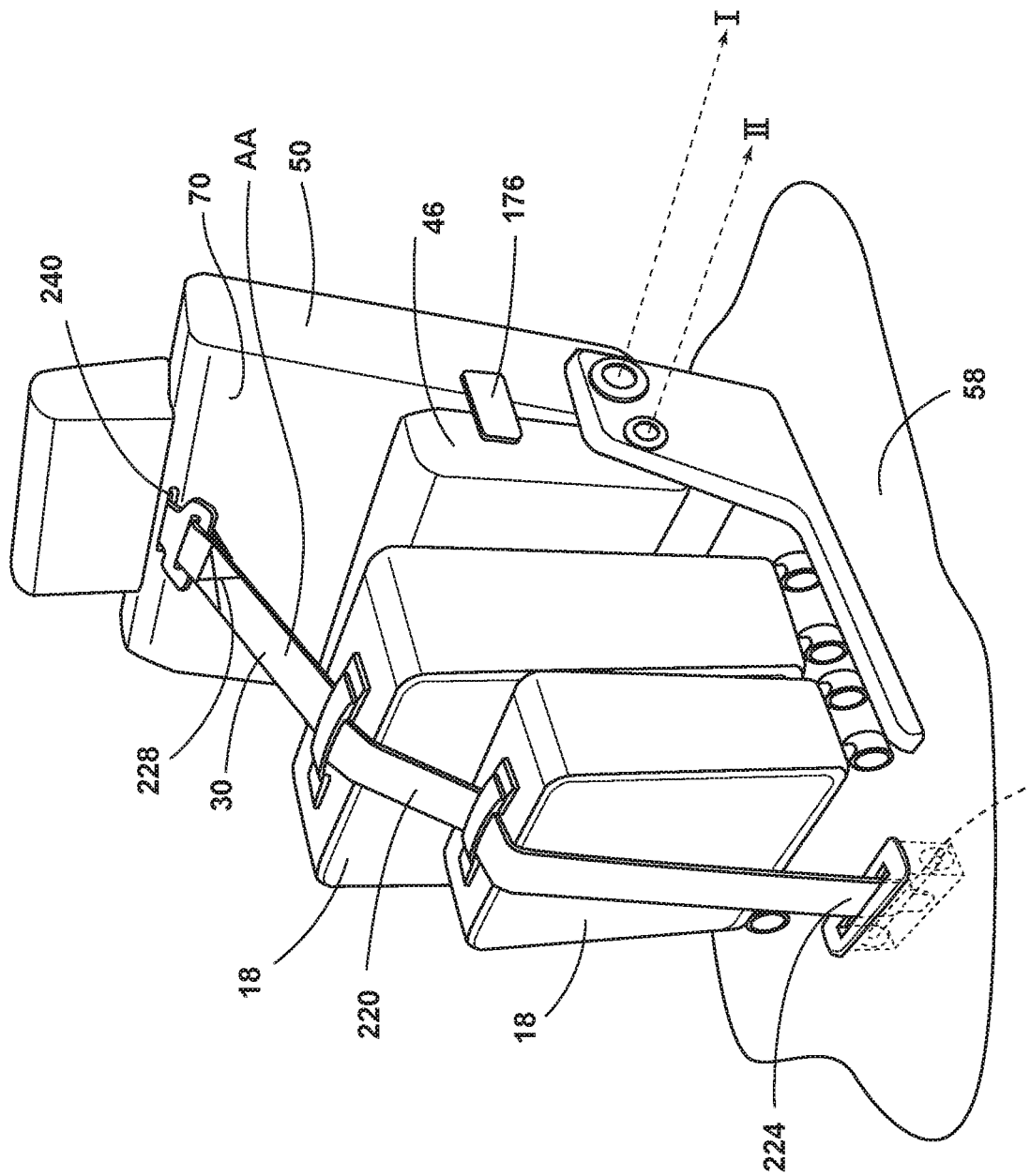
FIG. 8 is a perspective view of a seating assembly with a seat in the stadium position and a retention device in the cargo storage position, according to another example.

Referring to FIG. 8, the retention device 30 is shown in a cargo storage position AA. The retraction mechanism 216 is shown disposed in a floor 58. A slot 240 for receiving a tether 232, a tongue 236, or other attachment piece that may be disposed on the free end of the strap 220 is shown in an upper portion 70 of the seatback 50.

Figure 9:
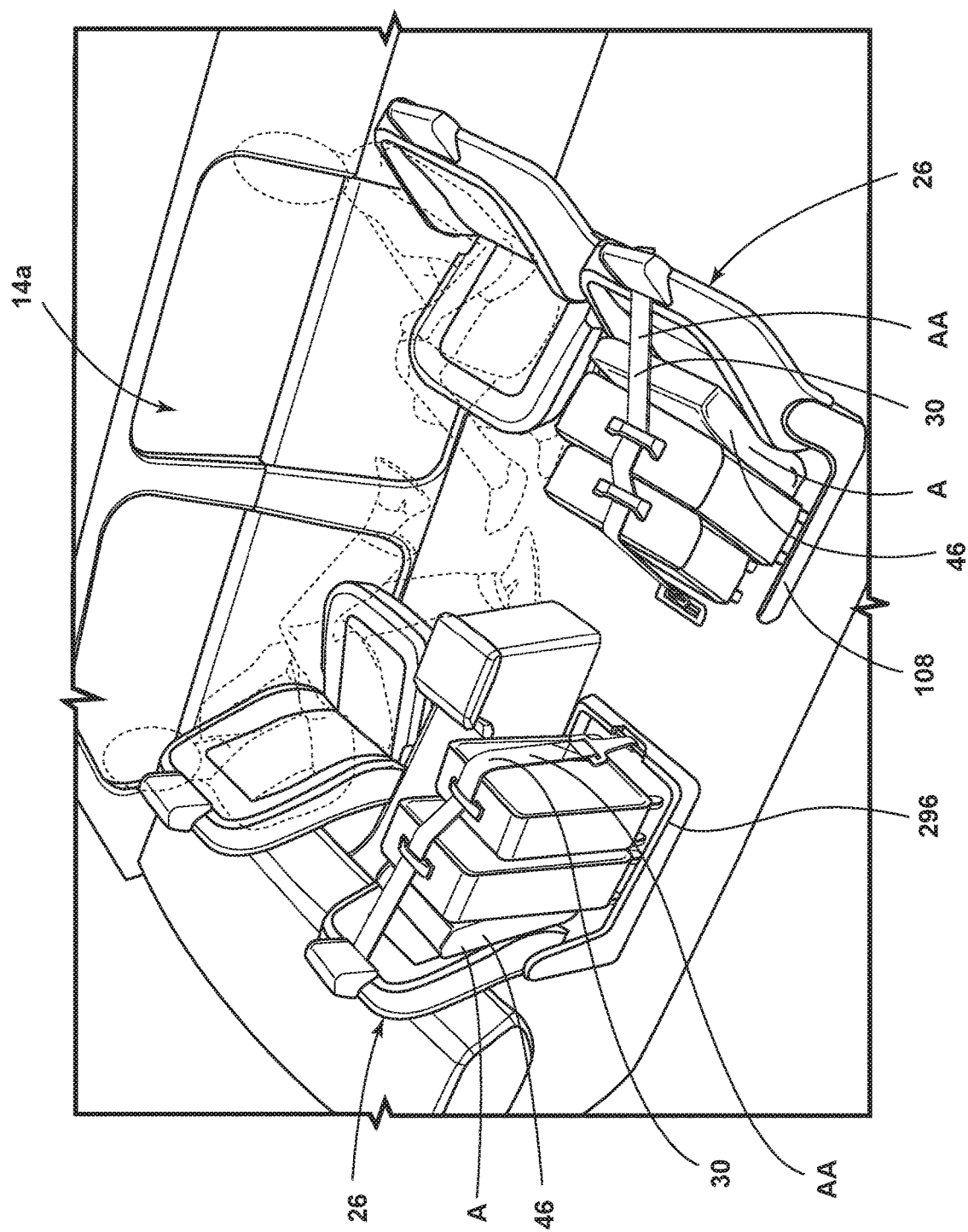
FIG. 9 is a perspective view of a vehicle interior with seating assemblies in stadium positions and retention devices in cargo storage positions.

Referring now to FIG. 9, a vehicle interior 14a is shown with the seating assemblies 26. The seating assemblies 26 may include retention devices 30 in a cargo storage position AA. The seating assemblies 26 may include a tray 296. The seating assemblies 26 may also include first and second cargo positioners 104 (not shown), 108.

Figure 10:
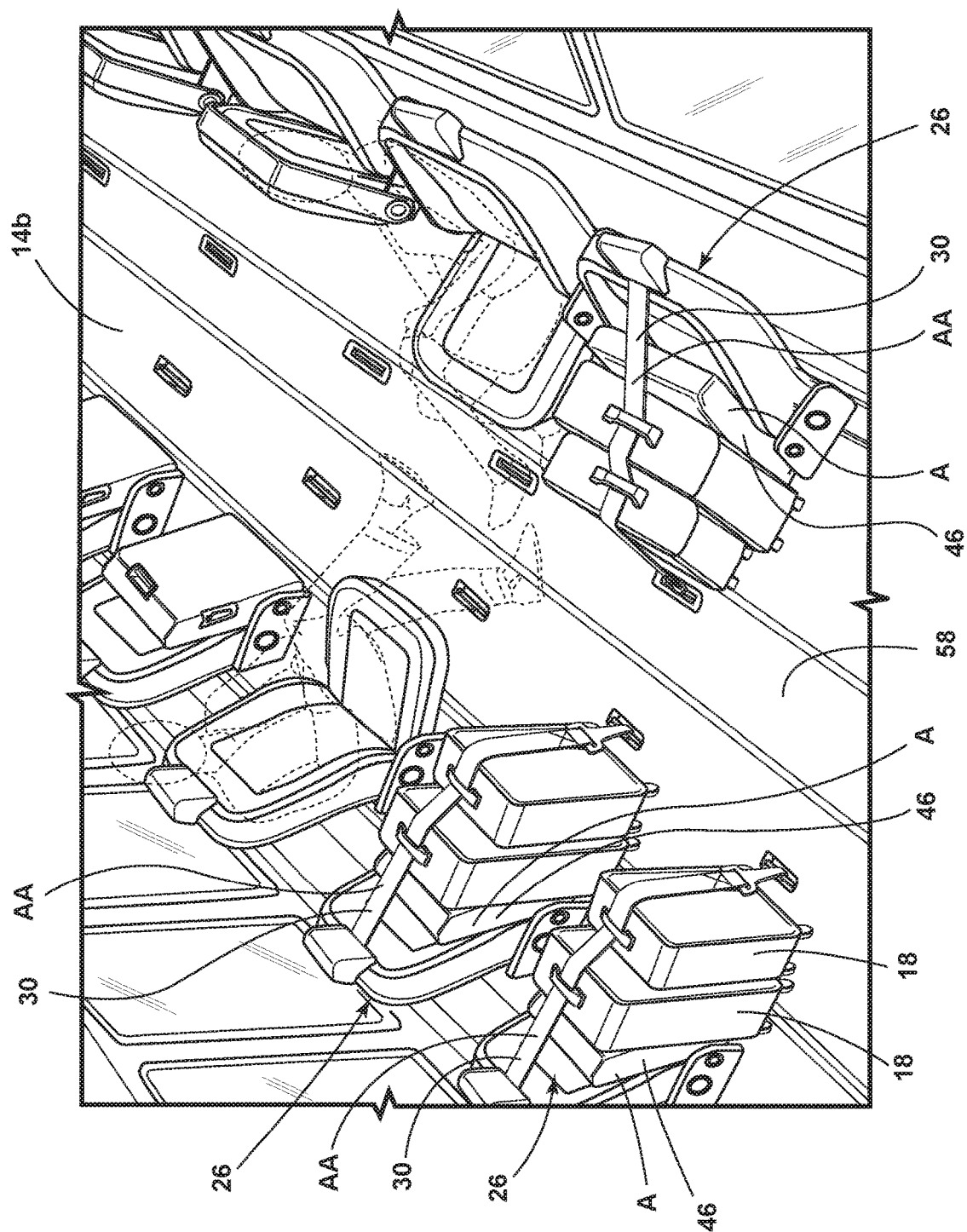
FIG. 10 is a perspective view of a vehicle interior with seating assemblies in stadium positions and retention devices in cargo storage positions.

Referring to FIG. 10, a vehicle interior 14b is shown with the seating assemblies 26. The seating assemblies 26 may include seats 46 in stadium positions A and retention devices 30 in cargo storage positions AA. The seating assemblies 26 may include seats 46 that are mounted to the side of the vehicle interior 14b. The cargo (luggage pieces 18) is shown disposed on the floor 58 of the vehicle interior 14b.

A variety of advantages may be derived from use of the present disclosure. The seating assembly with retention device may allow for simple, economical storage of luggage in a passenger compartment of a vehicle interior in a secure manner. The seating assembly with retention device may be included in an existing seat structure with limited incremental content to create a new and useful cargo (including luggage) management system. The seating assembly with retention device may be used in various vehicle interiors. The seating assembly with retention device may be used in conventional and non-conventional seating configurations. The seating assembly with retention device may limit the movement of cargo within the passenger compartment of the vehicle interior during standard driving conditions, erratic driving conditions, and dynamic events such as vehicle collisions.

It is to be understood that variations and modifications can be made on the afore-mentioned structure without departing from the concepts of the present disclosure, and further it is to be understood that such concepts are intended to be covered by the following claims unless these claims by their language expressly state otherwise.

What is claimed is:

1. A vehicle comprising:
   a floor:
   a seating assembly attached to a vehicle interior and including:
      a seat that is rotationally operable relative to a seatback; and
      a retention device comprising a strap secured to a retraction mechanism, wherein the retraction mechanism is disposed in one of the seating assembly and the floor, and the strap is configured to connect to the other of the seating assembly and the floor in a cargo storage position via an attachment piece connecting to a lock mechanism, the retention device selectively positionable in a stored position or the cargo storage position and extending between the seatback and the floor disposed adjacent to the seating assembly, wherein the seat is selectively positionable forward of the seatback in a seating position or a stadium position, and wherein the retention device in the cargo storage position, the seat in the stadium position, and the floor at least partially define an enclosure forward of the seatback configured to secure cargo to the floor and the seat.

2. The vehicle of claim 1, wherein the retraction mechanism is disposed in the seatback.

3. The vehicle of claim 2, wherein the retraction mechanism is disposed in the floor.

4. The vehicle of claim 2, wherein a free end of the strap is selectively releasable from the retraction mechanism and wherein a free end of the strap is configured to be received by a slot in the floor.

5. The vehicle of claim 3, wherein the strap is selectively releasable from the retraction mechanism and wherein a free end of the strap is configured to be received by a slot in the seatback.

6. The vehicle of claim 1, further comprising a tray disposed on the floor.

7. The vehicle of claim 6, wherein the tray includes a raised edge disposed around a perimeter of the tray.

8. The vehicle of claim 7, wherein the tray includes a striker for coupling a free end of the strap to the tray.

9. The vehicle of claim 1, further comprising:
   first and second cargo positioners disposed on the floor.

10. The vehicle of claim 1, wherein the retention device includes a cover extending between the seatback and the floor.

11. The vehicle of claim 10, wherein the cover is contained in the seatback in the stored position.

12. The vehicle of claim 11, wherein the cover is secured to the edge portion of the seatback and the floor in the cargo storage position.

13. A seating assembly comprising:
   a seat selectively positionable in one of a seating position and a stadium position;
   a seatback, wherein the seat is forward of the seatback; and
   a retention device comprising a strap secured to a retraction mechanism and coupled to the seatback, wherein the retention device is selectively deployable from a stored position to a cargo storage position, and wherein the retention device in the cargo storage position defines an enclosure forward of the seatback at least partially defined by the seat and a floor, wherein the retraction mechanism is disposed in one of the seating assembly and the floor and the strap is connected to the other of the seating assembly and floor via an attachment piece connecting to a lock mechanism in the cargo storage position.

14. The seating assembly of claim 13, wherein the retention device in the cargo storage position defines an enclosure at least partially defined by the seat in the stadium position and the floor.

15. The seating assembly of claim 13, wherein an exposed length of the retention device is selectively adjustable.

16. The seating assembly of claim 13, wherein the retention device includes a retraction mechanism and wherein the retention device is contained in the retraction mechanism when the retention device is in the stored position.

17. A vehicle storage system comprising:
   a seating assembly including a seat and a seatback, wherein the seat is forward of the seatback;
   a floor; and
   a retention device comprising a strap secured to a retraction mechanism, the retention device positionable between an upper portion of the seatback forward of the seatback and an area of the floor disposed proximate the seating assembly, wherein the retention device is selectively extendable from at least one of the upper portion of the seatback and the area of the floor disposed proximate the seating assembly, wherein the retraction mechanism is disposed in one tips the seating assembly and the floor and the strap is connected to the other of the seating assembly and the floor via an attachment piece connecting to a lock mechanism in the cargo storage position.

18. The vehicle storage system of claim 17, wherein the retention device is selectively retractable into at least one of the corresponding upper portion of the seatback and the area of the floor disposed proximate the seating assembly.

* * * * *